Jan. 20, 1959   H. R. ANDERSON ET AL   2,870,022
DOUGH MIX PACKAGE
Filed July 22, 1954
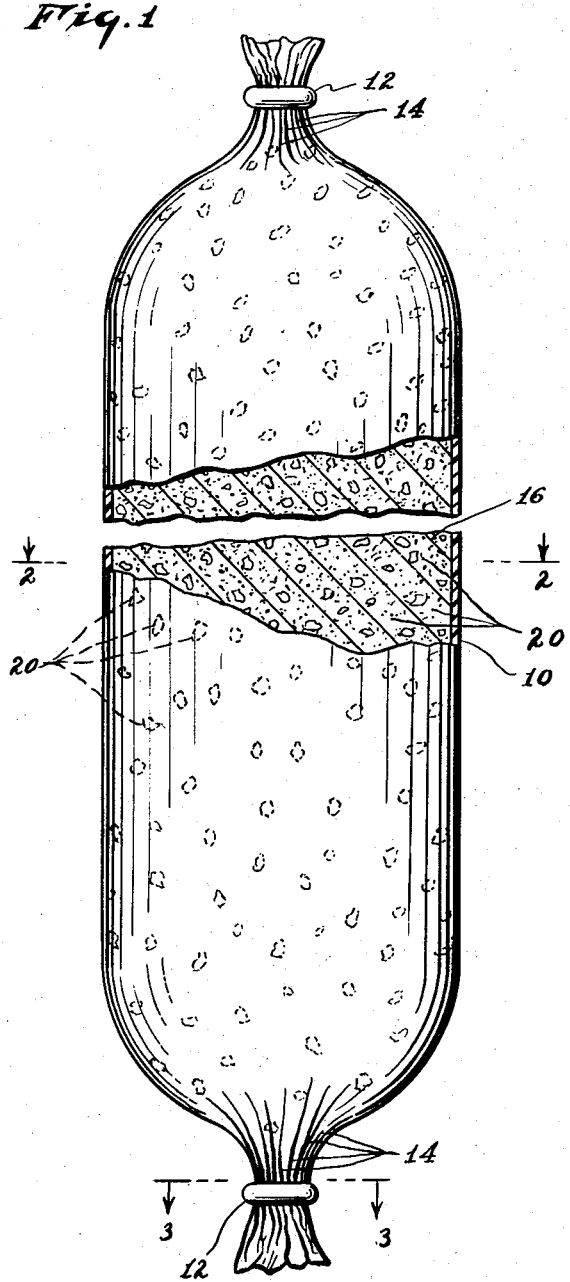
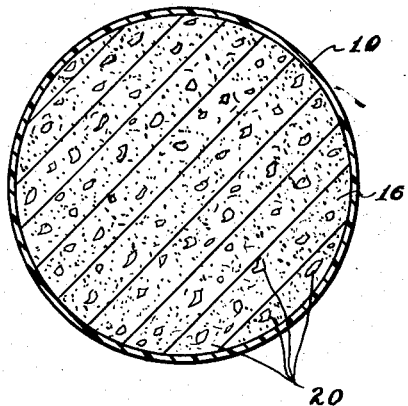
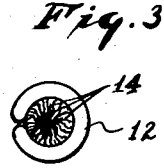
INVENTORS
Harry R. Anderson
Salvatore Esposito
Joseph A. Rossi
BY Emery, Varney,
Whittemore & Dix.
ATTORNEYS

2,870,022
DOUGH MIX PACKAGE

Harry R. Anderson, Cresskill, Salvatore Esposito, Cliffside Park, and Joseph A. Rossi, Ridgefield, N. J.; said Anderson assignor to said Esposito and said Rossi Application July 22, 1954, Serial No. 445,014

2 Claims. (Cl. 99—172)

This invention relates to the packaging of dough mixes, and more especially to prepared cookie mixes.

In order to avoid the trouble and muss of making cookies, many housewives prefer to buy prepared cookie mixes. These mixes are generally packaged in dry form, and the powdered contents of the package are merely mixed with water or milk to make the dough from which the cookies are baked.

The shelf life of a dry cookie mix is limited. After a length of time, dependent upon climatic conditions, the mix becomes wormy, and sometimes sour. Another disadvantage is that whereas much of the mess of mixing the dough is eliminated by buying a prepared mix, it is not all eliminated because it is necessary to mix the powdered contents of the package with water or milk in a mixing bowl. The housewife can purchase prepared dough which is ready for baking, but such doughs have a very short shelf life, even when kept under refrigeration.

It is an object of this invention to provide a prepared cookie dough which is packaged so as to have a very long shelf life, and in such a way that the dough can be used with the same convenience as rolls of "ice box cookie dough."

In accordance with one feature of the invention, the prepared dough is packaged in a plastic tube, preferably of round cross section, and the tube is hermetically sealed at both ends. In order to more thoroughly exclude air from the tube, the gathered ends of the tube are preferably filled with dough. The tubing itself is made of a thin material which can be sliced with the same ease as bologna rolls. The preferred embodiment of the invention uses a tube constructed of polyethylene. This plastic is strong, impervious to air and moisture at ordinary temperatures and pressures, and it has proven itself to be an especially effective food wrap.

The dough package of this invention is frozen, but it is not essential that it be kept frozen at all times. If it softens it can be refrozen without injury to the mix and without impairing the quality of the cookies obtained when the mix is baked.

Other objects, features and advantages of the invention will appear or be pointed out as the description proceeds.

In the drawing, forming a part hereof, in which like reference characters indicate corresponding parts in all the views;

Figure 1 is a fragmentary view, partly broken away and in section, showing a dough mix package made in accordance with this invention;

Figure 2 is a sectional view taken on the line 2—2 of Figure 1; and

Figure 3 is a sectional view through one of the sealed ends of the package, the section being taken on the line 3—3 of Figure 1.

A tube 10 of plastic film, preferably a tube of polyethylene film, is closed at its lower end by being gathered and sealed by a metal ring 12 which is closed tightly around the gathers 14 of the polyethylene. No heat or liquid sealing material is necessary in order to obtain a hermetic seal with the ring 12.

The tube above the closed bottom end is filled with a prepared dough 16, which is preferably packed down into the lower end of the tube between the gathers 14 so as to eliminate as much of the air as possible. The upper end of the package is sealed by another metal ring 12, which is forced closed around the gathers 14 of the tube to provide a hermetic seal for the top of the tube. The length of the tube 10 depends upon the size of package which it is desired to make.

It is not necessary to make small packages so that the entire contents can be used at one time, because after the package has been opened, the contents will keep for a considerable length of time if frozen or kept in a refrigerator at a temperature not higher than about 40° F. Under such refrigeration, the contents of the opened package will keep for a week or more. The contents of the package will keep indefinitely as long as the package is left sealed and kept frozen.

The polyethylene tube 10 is transparent so that the contents of the package are visible to a purchaser. One of the advantages of the packaged cookie mix of this invention is that it can be used with doughs containing chocolate particles which are one of the popular ingredients of certain kinds of cookies. Experience has shown that when such chocolate particles are mixed in the cookie dough and packaged in accordance with this invention, the chocolate will keep indefinitely without "blooming." This remains true even though the chocolate is subjected to the low temperature required to freeze the dough. Plastic tubing, including polyethylene tubing, has been used for packaging different kinds of foodstuffs; but the package of this invention having prepared dough, and more particularly cookie dough, packaged in the plastic tube and frozen, obtains a number of results which appear to be unexpected. For example, the frozen dough mix from the package of this invention seems to bake more quickly than the same dough mixed freshly prepared at room temperature, and the color, texture and taste of the cookie seem better when the cookie is made from the package of this invention than when made from exactly the same ingredients mixed freshly at room temperature and baked either immediately or after standing for a substantial period of time.

Experience has shown that a cookie mix prepared from dry ingredients and baked immediately or within a few hours of the time it is mixed requires about fifty percent longer baking time than a cookie mix of the same ingredients sliced from a frozen package made in accordance with this invention. Even if the cookie mix from the package of this invention is allowed to soften and stand for several hours at room temperature, it still bakes in substantially less time than a freshly prepared cookie mix made from the same ingredients taken from a dry mix package.

Tests made with cookies baked from dough taken from the package of this invention, both frozen and melted, were compared with cookies made from the same mix prepared directly from dry ingredients and baked immediately and within several hours of the time of mixing. Strangers were asked to select from the various cookies those which they preferred for color, texture and taste, the tests for these different qualities being separate tests. In all tests, the cookies made from the package of this invention were overwhelming favorites.

The preferred embodiment of the invention has been illustrated and described, but changes and modifications can be made without departing from the invention as defined in the claims.

What is claimed is:

1. A cookie dough mix package for subjection to deep-freeze temperatures and alternate periods of thawing, said package comprising a plastic tube of moisture and air-impervious, flexible material forming a skin of the package, a frozen dough filling the tube, both ends of the tube being tightly gathered, two metal rings, one clamped at each end of the package around the tightly gathered end of the package and holding the gathers so tightly clamped that there is a hermetic seal provided by the clamping force for each end of the package, the dough completely filling the package and being packed into the gathers at both ends of the package inward from the location of each clamping ring, and the dough containing all of the ingredients for a baked cookie including the necessary liquid ingredients, said tube being made of polyethylene film which expands and contracts with change in volume of the dough mix due to changes in temperature, and leaves the skin of the package pliable to prevent splitting and to facilitate slicing of the package into thin cookie blanks with the dough in a frozen condition.

2. The cookie dough mix package described in claim 1 and in which the dough contains particles of chocolate distributed therethrough and with some of the particles on the surface of the mass of dough within the package, and in which the polyethylene skin of the package is sufficiently transparent to expose the surface particles of chocolate to view for indicating the kind of cookie dough mix within the package.

References Cited in the file of this patent

UNITED STATES PATENTS

| | | |
|---|---|---|
| 1,988,058 | Traller | Jan. 15, 1935 |
| 2,039,374 | Young | May 5, 1936 |
| 2,493,063 | Frank et al. | Jan. 3, 1950 |
| 2,604,244 | Tripp | July 22, 1952 |
| 2,735,149 | Frank | Feb. 21, 1956 |

OTHER REFERENCES

"Refrigerating Engineer" Feb. 1954, pp. 45 to 48, inclusive, article entitled, "Protective Packaging of Frozen Foods."

"Chemistry Flavoring and Manufacture of Chocolate Confectionery and Cocoa" by Jensen 1931, publ. by J. and A. Churchill, London, pp. 150-152.

"Encyclopedia Cookbook" by Ruth Berolzheimer 1948, publ. by Culinary Arts Institute, Chicago, pp. 758 and 759.

"Food Industries," Sept. 1948, pp. 95, 96 and 97, article entitled, "Improved Bread Made From Frozen Dough."

"Quick Frozen Foods" June 1950, p. 83, article entitled, "Polyethylene For Foods."